(12) United States Patent
Lich et al.

(10) Patent No.: US 8,820,830 B2
(45) Date of Patent: Sep. 2, 2014

(54) VEHICLE SEAT

(75) Inventors: Thomas Lich, Schwaikheim (DE); Marc Zimmermann, Leonberg (DE); Gian Antonio D'Addetta, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 12/998,569

(22) PCT Filed: Sep. 17, 2009

(86) PCT No.: PCT/EP2009/062052
§ 371 (c)(1),
(2), (4) Date: Jul. 8, 2011

(87) PCT Pub. No.: WO2010/052058
PCT Pub. Date: May 14, 2010

(65) Prior Publication Data
US 2011/0254330 A1    Oct. 20, 2011

(30) Foreign Application Priority Data

Nov. 10, 2008 (DE) .......................... 10 2008 043 617

(51) Int. Cl.
  *B60N 2/42*     (2006.01)
  *B60R 21/0136*  (2006.01)
  *B60N 2/427*    (2006.01)
  *B60N 2/44*     (2006.01)
  *B60N 2/02*     (2006.01)

(52) U.S. Cl.
  CPC .............. *B60N 2/449* (2013.01); *B60N 2/4279* (2013.01); *B60N 2002/0268* (2013.01); *B60N 2/42727* (2013.01); *B60N 2/0276* (2013.01); *B60N 2/4235* (2013.01)
  USPC ............... 297/216.13; 297/284.9; 297/216.1; 297/284.1

(58) Field of Classification Search
  USPC ......... 297/284.6, 216.1, 216.3, 284.9, 216.13
  See application file for complete search history.

(56) References Cited

U.S. PATENT DOCUMENTS

| | | | | |
|---|---|---|---|---|
| 3,623,768 A * | 11/1971 | Capener et al. | ............... | 297/330 |
| 4,924,162 A   | 5/1990  | Sakamoto et al. | | |
| 5,975,633 A * | 11/1999 | Walk et al. | .................. | 297/284.9 |
| 5,988,674 A * | 11/1999 | Kimura et al. | ............. | 280/730.2 |
| 6,206,470 B1* | 3/2001  | Baloga et al. | .............. | 297/250.1 |
| 7,232,174 B1* | 6/2007  | Trott | ........................... | 296/65.17 |
| 7,357,454 B2* | 4/2008  | Schiener et al. | ........... | 297/284.9 |
| 8,136,880 B2* | 3/2012  | Biaud et al. | ................ | 297/250.1 |

(Continued)

FOREIGN PATENT DOCUMENTS

| | | |
|---|---|---|
| DE | 100 43 290      | 4/2002 |
| DE | 203 14 924      | 1/2004 |
| DE | 102 58 245      | 6/2004 |
| DE | 10 2005 002 393 | 8/2006 |

(Continued)

*Primary Examiner* — Sarah B McPartlin
(74) *Attorney, Agent, or Firm* — Kenyon & Kenyon LLP

(57) ABSTRACT

A vehicle seat arrangement includes a seat body that includes a seat and a seat back at a rear of the seat. The vehicle seat arrangement also includes displaceable seat components which produce a lateral bracing as a function of accelerations in the direction of a transverse vehicle axis. The displaceable seat components are at least partly extendable in a necessitating situation. In a retracted state, the displaceable seat component is situated entirely within the seat back. In an actuated state, the displaceable seat component extends forward from an interior of the seat back, thereby forming an interior sidewall of the seat.

14 Claims, 4 Drawing Sheets

(56) References Cited

U.S. PATENT DOCUMENTS

2005/0067827 A1    3/2005  Bostrom et al.
2007/0057551 A1*   3/2007  Lachenmann et al. ..... 297/284.9
2007/0096444 A1*   5/2007  Bostrom et al. ........... 280/730.2
2012/0086250 A1*   4/2012  Stoessel et al. ............ 297/284.9

FOREIGN PATENT DOCUMENTS

| EP | 1 470 969 | 10/2004 |
| GB | 2 334 006 | 8/1999 |
| WO | WO 00/12350 | 3/2000 |

\* cited by examiner

VEHICLE SEAT

BACKGROUND OF THE INVENTION

1. Field of the Invention

The present invention relates to a vehicle seat, as well as an operating method for a vehicle seat.

2. Description of Related Art

In side collisions, injuries ranging from severe to fatal often occur to vehicle occupants on both sides of the vehicle, i.e. on the side facing both toward and away from the crash. A determination of the frequency of side collisions in which at least one person is sitting on the vehicle side facing toward the crash reveals this figure to be 70%, for whom an increased probability of injury exists. With regard to the vehicle side facing away from the crash, it is found that in approximately 65% of cases, at least one person was sitting on the vehicle side facing away from the crash.

A variety of restraint systems and structural solutions are used at present in vehicle engineering in order to reduce the consequences of side collisions. These include chiefly side airbags, for example curtain airbags, head airbags, or combined head/thorax airbags, or special stiffeners in the vehicle structure, for example sills or side impact protection systems. In the context of a side collision, the purpose of these systems is both to protect the occupants from contact with intruding vehicle parts on the direct crash side, and to dissipate some of the occupants' motion energy.

The thorax airbag or combined head/thorax airbag, which is installed on the outer side of the seat, on the B pillar, or increasingly often in the door region, typically serves as a first impact protection for the vehicle occupants. The triggering times for these airbag units are usually in the range from 5 to 8 ms after contact between the vehicle and an obstacle, or after a crash. Inflation times vary, depending on the airbag volume and the gas generator technology used, between 10 and 20 ms. In the most optimum case, a protective system of this kind should possess one hundred percent of its protective effect 15 ms after detection of the crash. The dwell time of this type of side airbag, which slides between the occupant or seat and the B-pillar or vehicle door, is 80 to 120 ms, especially since a rebound motion of the occupant away from the damaging structure has already started after that time period. In order to meet stringent requirements in terms of triggering time and inflation time, it is common to use combined pyrotechnic compressed-gas generators that, already at an early stage of activation of the generator (i.e. 2 to 5 ms after detection), possess sufficient energy to inflate the airbag. Starting at 5 to 10 ms, the compressed gas generator portion of the gas generator then ensures the required consistency in gas outflow.

A different situation is apparent with regard to head, window, or curtain airbags. These serve exclusively to protect the head. Considerably more time is therefore available to them for the inflation operation, but the airbag volume is also considerably greater. Their dwell time is also several times longer (5 seconds), since rollover accidents need to be accounted for.

With the introduction of new side crash regulations in the United State, the situation for vehicle manufacturers in terms of side crash performance will change considerably. According to these new regulations, an oblique pole crash at 32 km/h, in which a vehicle is rotated 15° with respect to the usual perpendicular crash direction, is now mandatory for all vehicles approved for the US market. This involves the use, for the first time, of a side crash test dummy representing a small female per SID-IIs. An improved EUROSID dummy per ES-2re is also stipulated. The overall goal of this new standard is to enhance head and thorax protection in a side impact. Preliminary studies have shown, however, that existing vehicles (with the exception of SUVs) must be adapted to these requirements and the corresponding injury criteria. A frequent problem is that in the aforementioned pole crash as defined by FMVSS213, the thorax airbag used to protect the thorax region may not inflate at all.

A further set of problems relates to the protection of occupants on the side facing away from the crash, for which the term "far side crash" is also used. Although attempts are being made to improve the performance of vehicle side structures by improving vehicle design, it is often impossible to ensure sufficient occupant protection by way of the vehicle structure on the vehicle side facing away from the crash. The consequence for a belted-in occupant sitting on the side of the vehicle facing away from the crash is often that he or she slides out of the seatbelt in the shoulder region because of insufficient tension uptake and thus insufficient friction between belt and occupant. The occupant is then immobilized essentially only by the lap belt, which prevents the occupant from being thrown out of the vehicle despite the diminished protective effect. Due to the insufficient immobilization of the occupant's torso, it can move more or less freely in the vehicle interior. The most common cause of injury as a result is collision with other occupants or, subsequently to rebound motion, collision with interior elements of the vehicle.

Given the accident scenario, restraint, systems at present are designed so that the side and head airbags are fired only on the vehicle side facing toward the crash, so that the occupant is not struck by intruding vehicle parts and so the airbag moves the occupant out of the danger zone. In the case of a rollover, it is usual for the head airbags provided for that purpose on both sides of the vehicle to fire, so that objects cannot penetrate from outside into the vehicle interior.

Solutions already exist for protecting occupants on the vehicle side facing away from the crash. German Utility Model DE 203 14 924 U1, for example, describes a safety assemblage for a vehicle occupant sitting on a vehicle seat, having a three-point safety belt that has a lap belt and shoulder belt. This safety assemblage contains an additional two-point shoulder belt that extends from the shoulder left exposed by the three-point safety belt and crosses the shoulder belt of the three-point safety belt. Because the risk exists, in a far side impact, that the occupant located on the side facing away from a crash may rotate out of the shoulder belt of the three-point safety belt as a result of force components acting from the interior of the vehicle, a two-point belt is additionally provided in this safety assemblage. This additional belt is also activated, in the shoulder region of the seatback, by way of an additional belt retractor, and crosses the shoulder belt of the three-point belt in the vehicle occupant's chest region. This additional two-point belt thus prevents the vehicle occupant from rotating out of the shoulder belt of the three-point belt.

A similar apparatus is described in German Patent DE 10 2005 002 393. This presents a vehicle occupant protection apparatus having a three-point safety belt in which the upper articulation, located in the vehicle occupant's shoulder region, for the shoulder belt, and the lower articulation for the lap belt, are located on the side of the vehicle seat facing away from the vehicle door that is adjacent to the vehicle seat. In addition, this system contains a side airbag that is disposed on the side of the vehicle seat facing toward the vehicle door and that deploys, upon triggering, between the vehicle door and vehicle occupant. This airbag is characterized in that it is equipped with a ventilation device, switchable on and off via a control apparatus, for the gas present in the inflated side airbag, and that the ventilation device is switched on upon detection of a side impact and is switched off upon detection of a vehicle rollover. Similar systems are described in published European Patent Application EP 1 470 969 A1.

A further solution proposes also to activate, after a corresponding delay, the lateral restraint means on the vehicle side facing away from the crash. This shows that further components of the safety equipment of modern vehicles possess a great deal of potential, to some extent not yet used, for protection in side crashes. One of these often-underestimated passive safety systems is the seat. In addition to the passive safety systems such as airbags, retractors, and belt tensioners, further systems that can improve the lateral retention of the occupants or also protect them better in the event of a collision are used in vehicles. These include sport seats having salient side flanks, or comfort seats that fill the side regions of the seat with air in a context of increased transverse acceleration. It is disadvantageous, however, that sport seats do not offer sufficient seating comfort for everyone, and are therefore less often installed in vehicles. A further disadvantage of these active, adaptable seats is that they operate on a very different time scale from the one necessary in the event of a crash, i.e. in the event of a crash it is not possible to trigger these systems within a timeframe suitable for protection. Dynamic seats of this kind nevertheless offer the advantage that as a result of the prior so-called "vehicle-dynamics" activation of the seat, the occupant is kept away from the side structure of the vehicle if the vehicle is carried out of a curve in the event of a skid. An alternative implementation of a vehicle-dynamics seat is, for example, a seat having a two-part backrest based on a "split-seat" concept. This seat follows the motions of the torso in every seat position, and ensures optimum relief of load on the spine. For example, if the driver leans back in the seat, the lower part of the backrest automatically pivots forward and supports the pelvis.

It is evident in this context that crash-active systems in the seat offer a great deal of potential for occupant protection in side crashes. A feature common to all the known solutions is that existing side elements and seat elements are moved or positioned in corresponding fashion. This occurs predominantly by inflation of the side bolsters in the case of an imminent side collision, or even after a contact. In all the systems presented, however, an additional apparatus that provides a safety belt or an additional airbag in the inner seat region is needed.

BRIEF SUMMARY OF THE INVENTION

The vehicle seat according to the present invention has the advantage that in a context of side collisions or highly dynamic lateral or transverse vehicle motions, an occupant of the vehicle in the vehicle seat is protected in position-dependent fashion from contact with structural parts of the interior of the vehicle, and/or the lateral retention of the occupant in the vehicle is enhanced. The invention provides for a vehicle seat having displaceable seat components that produce a lateral bracing as a function of accelerations in the direction of a transverse vehicle axis; according to the present invention, the seat components are integrated into the vehicle seat and are at least partly extendable in a necessitating situation. Advantageously, the vehicle seat according to the present invention encompasses three functions, namely the function of a protective system, the function of a conventional bucket seat or dynamic seat with lateral bracing, and the function of a child seat retaining system. Advantageously, the occupant is protected, in a manner coordinated with the necessitating situation, for as long as possible and preferably comprehensively, from contact with structural parts and, in the event of a crash, from intruding structural parts. The fact that the seat components extendable in a necessitating situation are integrated in space-saving (and thus cost-saving) fashion into the vehicle seat results in an active vehicle seat optimized for lateral motions of the vehicle and optimized against intrusion into the interior of the vehicle. A further advantage of the invention is the possible reversible embodiment of the system for lateral bracing, since the seat components are extendable from or retractable into the vehicle seat as required. A further advantage is use of the vehicle seat according to the present invention as a Pre-Safe system. Because the displaceable seat components of the vehicle seat trigger a movement of the occupant away from the side structure, the vehicle seat having these displaceable seat components can also be used correspondingly as a Pre-Safe system.

A further advantage is additional protection in the event that a secondary collision occurs, for example an impact against a tree with subsequent rollover, or in the context of other combinations of multiple successive crash events.

In an embodiment of the invention, the necessitating situation is a crash situation and/or a comfort requirement and/or a requirement for retaining a child seat. Advantageously, the seat components are movable out of an inactive position into a protective position bracing an occupant and/or a child seat in the direction of a transverse axis of the vehicle, thus enabling both a protective effect for an occupant in a crash situation, comfortable seating of the occupant in the vehicle, and/or retention of the child seat. The invention offers a further advantage for additional side protection when a child seat is installed on the passenger seat or rear seat. Lateral retention of the child and the child seat is thereby enhanced, thus reducing stress on the child's head.

Advantageously, the seat components counteract a motion of the occupant and/or of a child seat at least in the direction of the transverse vehicle axis. The advantage lies in improved lateral bracing of the occupant and/or the child seat as compared with a conventional protective system. This enhances the protective effect for the occupant in complex skid and side-crash situations, since the protective seat components ensure a direct coupling between the seat and occupant. A substantial advantage of the system is that the risk of ejection of the occupant from the vehicle in the event of a vehicle rollover is reduced.

The seat components are preferably displaceable mutually independently by way of at least one displacement device. The seat components are thus not only extendable out of the vehicle seat unilaterally or bilaterally, but multiple seat components provided on one side of the vehicle seat are also displaceable mutually independently. Advantageously, this results in a protective effect adapted to the necessitating situation, for example a bilateral protective effect by way of the seat components in the event of a side collision or sideways vehicle motion facing toward or away from the crash.

The at least one displacement device is preferably drivable electrically and/or mechanically and/or pyrotechnically and/or pneumatically and/or hydraulically. Advantageously, the drive system of the displacement device can be matched specifically to the particular necessitating situation, since the triggering times, and thus speeds, of the displacement device can be influenced by the selection of a drive system.

Advantageously, the at least one displacement device is activatable by a control system of the vehicle. Activation of the displacement device by the control system preferably occurs as a function of information about the occupant, the occupant position, the vehicle environment, an impact, and/or vehicle dynamics variables. Advantageously, an adaptation of the vehicle seat as a function of the acquired information can occur, so that a misadjustment can be successfully prevented. The possibility of individualization of the vehicle seat according to the present invention in terms of age, height, weight, and gender allows the displaceable seat components to be advantageously adapted individually to the occupants.

In an embodiment of the invention, the displacement device is additionally activatable by a user of the vehicle seat. As a result, the user advantageously has an influence on the comfort or function of the vehicle seat, although in a crash situation the comfort function is subordinated to the function directed toward securing the vehicle occupant.

In an embodiment of the invention, it is proposed that the displacement travel of the seat components depend on the necessitating situation and/or on the magnitude of the acceleration to be braced against.

It is further proposed that the seat components, when extended, proceed out substantially in the direction of a longitudinal vehicle axis. This advantageously ensures, in simple fashion, lateral bracing of an occupant and/or of a child seat.

The displaceable seat components are preferably integratable into a seat part, a backrest, and/or a headrest of the vehicle seat. Advantageously, multiple body regions of an occupant can thereby be braced, and protected from collisions, in the relevant triggering situation.

A preferred operating method for a vehicle seat is also described, in which the vehicle seat encompasses displaceable seat components that produce a lateral bracing as a function of accelerations in the direction of a transverse vehicle axis, and in which the seat components integrated into the vehicle seat are at least partly extended in a necessitating situation. The operating method advantageously makes possible a vehicle seat adapted in the best possible fashion to different occupants and necessitating situations.

DETAILED DESCRIPTION OF THE INVENTION

Figure 1:
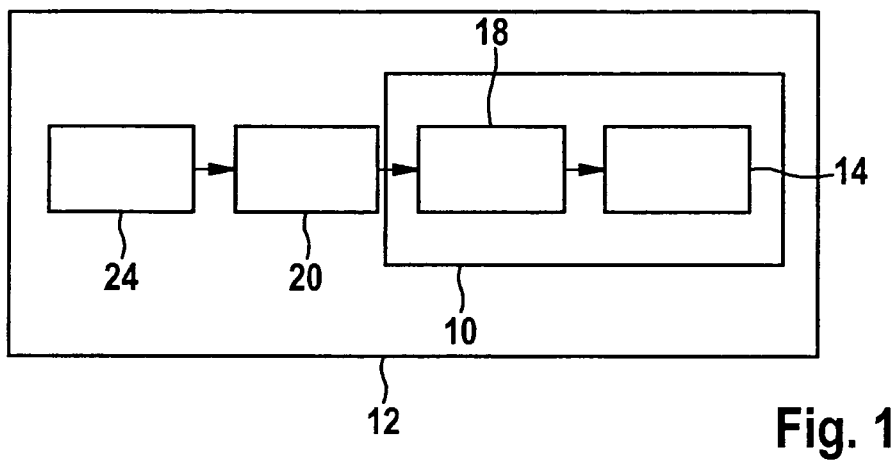
FIG. 1 is a schematic block diagram for activation of a vehicle seat according to the present invention.

As is evident from FIG. 1, a system for an occupant protection system in a vehicle 12 encompasses a sensor system 24, a control system 20, and at least one restraint means that encompasses a vehicle seat 10 having displaceable seat components 14 which produce a lateral bracing as a function of accelerations in the direction of a transverse vehicle axis 16. Control system 20 is preferably the airbag control device; other control devices disposed in the vehicle, for example an ESP control devices, or combined control devices, are also conceivable. Sensor system 24 possesses sensors that detect the vehicle state in terms of motion, surroundings, and crash situations. In other words, sensor system 24 senses information concerning a vehicle interior, a vehicle environment, an impact, and/or vehicle-dynamics variables. Control system 20 receives the sensed information from sensor system 24 and evaluates the received information in order to ascertain a present driving situation; control system 20 evaluates the ascertained present driving situation as to whether or not activation of the at least one restraint means is necessary. The received information regarding vehicle-dynamics variables, in conjunction with the information from the vehicle environment, allows control system 20 to apply control predictively to reversible restraint means if the probability of a possible collision, for example an impact with an obstacle, exceeds a predetermined threshold value.

Figure 2A:
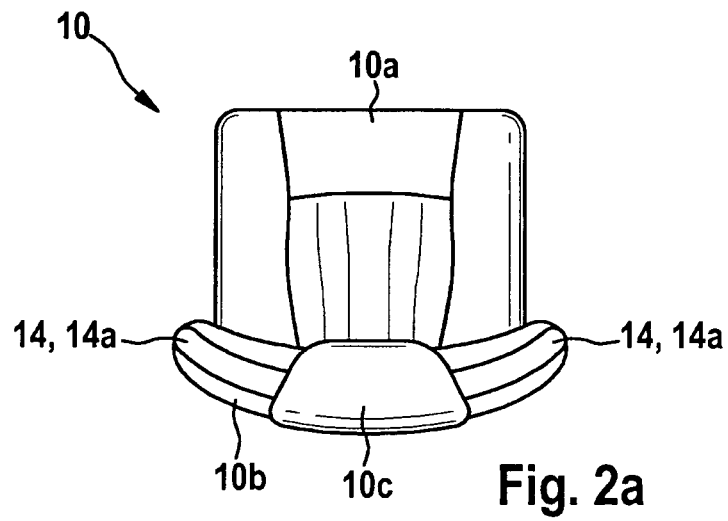
FIG. 2a is a plan view of the vehicle seat according to the present invention having displaceable seat components, the seat components being in a position retracted into the vehicle seat.
Figure 2B:
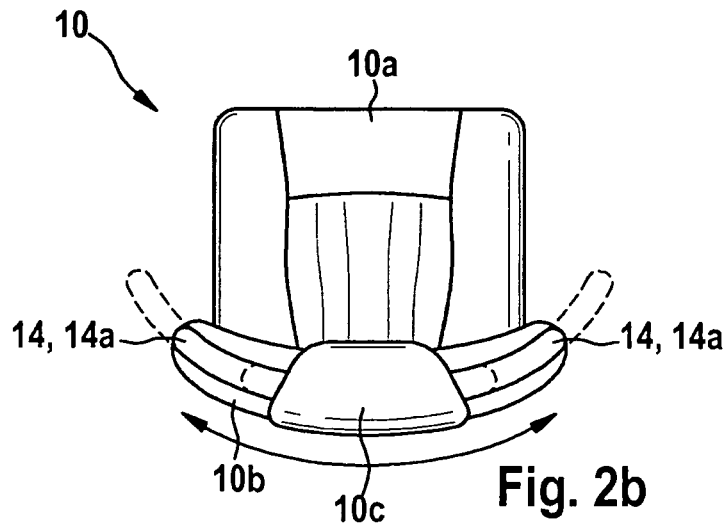
FIG. 2b is a plan view of the vehicle seat according to the present invention having displaceable seat components, both seat components being in a position extended out of the vehicle seat.
Figure 3:
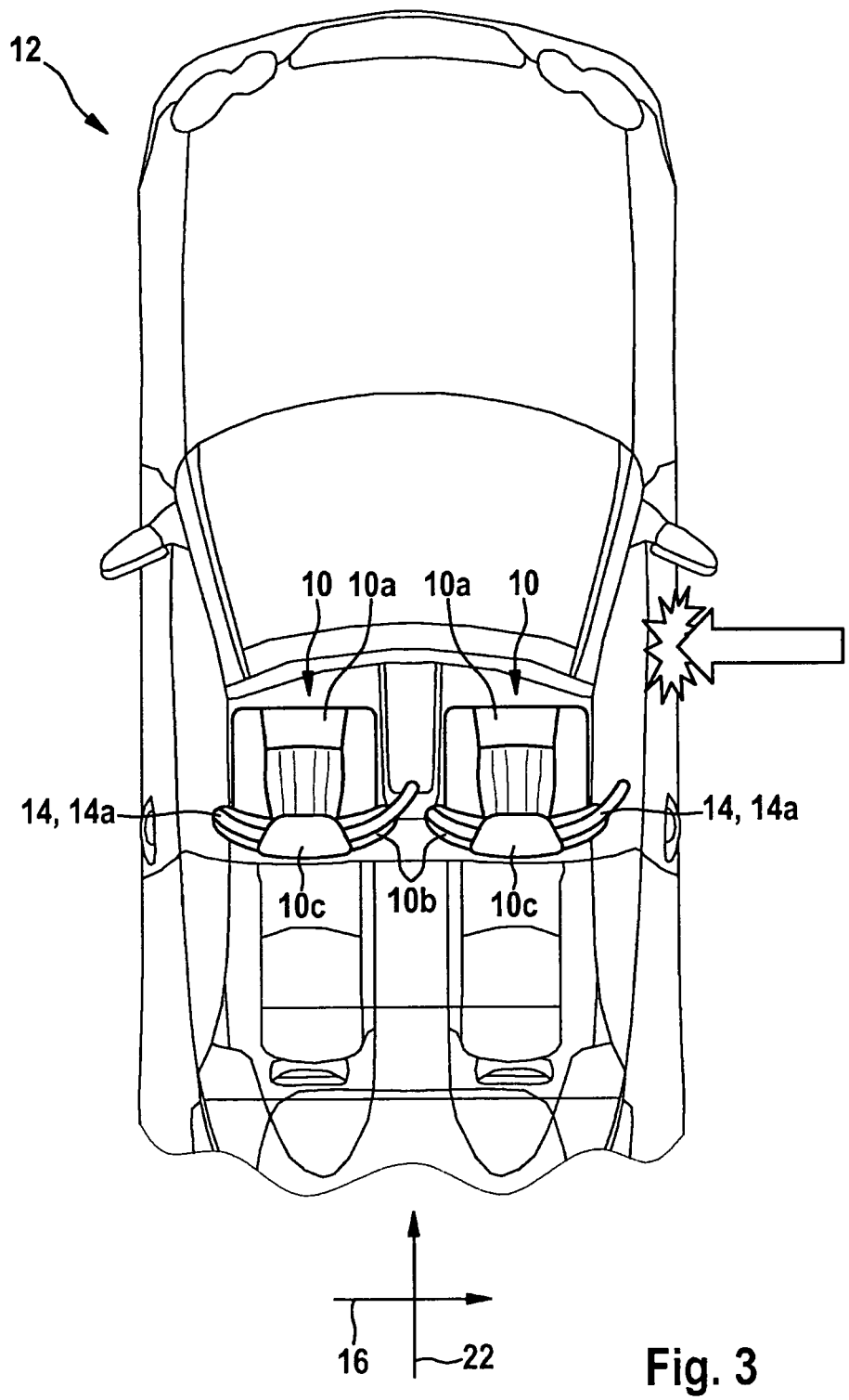
FIG. 3 is a plan view of a vehicle having vehicle seats according to the present invention having displaceable seat components, only one respective seat component of a vehicle seat being in a position extended out of the vehicle seat.
Figure 4:
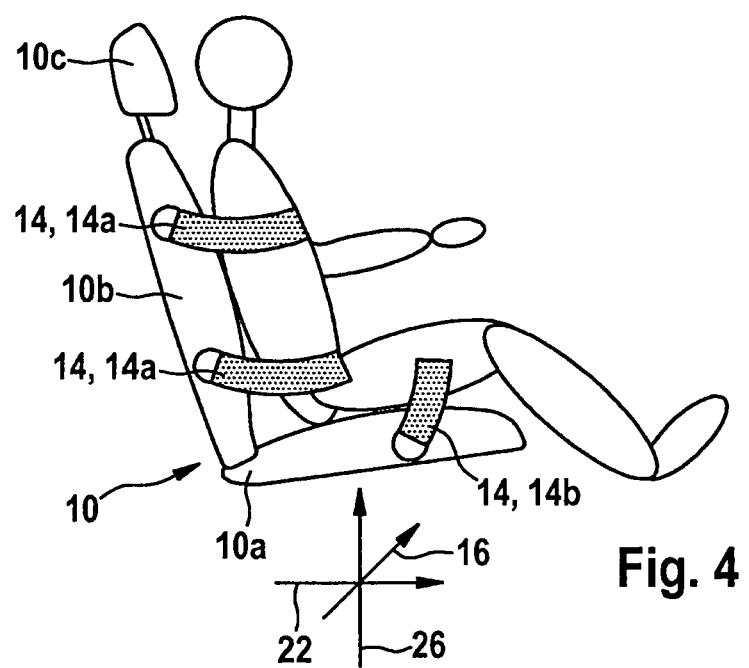
FIG. 4 is a simplified schematic depiction of a side view of a vehicle seat according to the present invention having seat components extended unilaterally, the seat components being integrated into a backrest and a seat part of the vehicle seat.

In the exemplifying embodiments depicted in FIGS. 2 to 4, the at least one restraint means is embodied as a vehicle seat 10 having displaceable seat components 14; further restraint means such as, for example, airbags and/or further seat actuator suites can of course also be present. FIGS. 1 to 4 depict, by way of example, a vehicle seat 10 having displaceable seat components 14; multiple vehicle seats 10 having displaceable seat components 14 can also be provided in vehicle 12. The manner of operation of vehicle seat 10 fits without difficulty into an existing restraint system concept.

FIGS. 2 to 4 show a vehicle seat 10 according to the present invention of a vehicle 12, having displaceable seat components 14 that produce a lateral bracing as a function of accelerations in the direction of a transverse vehicle axis 16.

According to the present invention, seat components 14 are integrated into vehicle seat 10. In general, an integration of seat components 14 into a seat part 10a and/or a seatback 10b and/or a headrest 10c and/or a further part of vehicle seat 10 is conceivable.

According to the present invention, seat components 14 are at least partly extendable out of vehicle seat 10 in a necessitating situation. The necessitating situation can be a crash situation and/or a comfort requirement and/or a requirement for retaining a child seat. Depending on the occupancy of the seat and/or the driving situation, seat components 14 can thus be located in a crash position and/or a comfort position and/or a retaining position. Seat components 14 can thus serve for lateral bracing of an occupant and/or of a child seat and/or of a further object present on vehicle seat 10. In the crash situation and/or comfort situation and/or retention situation, seat components 14 counteract a movement of the occupant and/or of a child seat and/or of an object present on vehicle seat 10, at least in the direction of transverse vehicle axis 16. The displacement travel of seat components 14 depends in each case on the necessitating situation and/or on the magnitude of the acceleration to be braced against.

Sensor system 24 of vehicle 12 possesses sensors that detect the vehicle state in terms of motion, environment, and crash situations. Possible sensors for detecting a relevant vehicle state can be embodied as a yaw rate sensor, transverse acceleration sensor, side collision sensor, and/or surroundings sensor, which enables e.g. optical collision object recognition. When a relevant vehicle state, for example an elevated transverse velocity and/or a side collision, is identified, selected seat components 14 are then rotated or extended in controlled fashion toward the side facing toward the crash or in the direction of the transverse velocity vector. Two basic degrees of freedom are preferably provided, namely a rotation about a defined axis, for example a vertical vehicle axis 26 or a longitudinal vehicle axis 22; and a translation, for example in the direction of longitudinal vehicle axis 22. Implementation of these motion-related degrees of freedom requires, for example, rotary joints for the rotation degree of freedom or, for example, rail elements for the translation degree of freedom. These motion-related degrees of freedom should in principle be configured reversibly, so that on the one hand vehicle-dynamics assistance and therefore reversibility of the systems in normal driving operation is guaranteed, and on the other hand the safety functions can be activated in a crash situation. In an embodiment of the system according to the present invention, the motion state of vehicle 12 can be detected after a triggering collision as well, so that the occupants can thereby also be protected in follow-on collisions or skidding events. For this, depending on the momentum force acting on the occupants, seat components 14 can travel into a left or right end position so that the occupants are optimally intercepted at every point in time.

Seat components 14 are displaceable, mutually independently, by way of at least one displacement device 18 that can be driven, for example, electrically and/or mechanically and/or pyrotechnically and/or pneumatically and/or hydraulically. The at least one displacement device 18 or drive system 28 can be activated by a control system 20 of vehicle 20. In addition, displacement device 18 can be activated by a user of vehicle seat 10.

In an embodiment of the invention, seat components 18 can be extended, in the context of a severe side collision, by the release of energy from vehicle seat 10. This can be accomplished, for example, as a result of a pyrotechnic discharge, or in an electromechanical, pneumatic, or hydraulic manner. Also suitable in the same fashion are mechanical actuators, for example pre-tensioned spring elements, that permit an abrupt release of energy. A combination of the above systems is likewise conceivable. The background is always that seat components 14 be appropriate for the demands of a rapid motion. As already mentioned, ordinarily the triggering times for side airbags are approx. 5 to 10 ms after collision, and the inflation time is another 10 to 15 ms. This corresponds to the time span also available to seat components 14 according to the present invention, in a crash situation, in order to reach their respective final position. These same triggering time spans occur in the case of the side facing away from the crash. If an activation of seat components 14 takes place in advance, for example by way of a motion of the vehicle itself or a predictive lateral sensor suite, the activation time period can then be increased (depending on the sensor suite) in the range of approximately 150 ms.

A further embodiment of vehicle seat 10 according to the present invention is the coupling between the decision to activate seat components 14, and an interior monitoring system. If an occupant is in a triggering-critical position, triggering of the displacement of seat components 14 can then be aborted. A triggering-critical position might exist when body parts are present in the motion space of an armrest of vehicle seat 10, i.e. when, for example, a passenger is resting his or her head on the passenger door, or on the driver, in order to sleep. A corresponding interior sensor suite for detection of an occupant position can be embodied as camera systems or seat occupancy systems. Supplementary information that is not immaterial to activation of seat components 14 can also result from occupant classification systems. In other words, the weight, height, age, and gender of the occupants can be incorporated into the determination and activation of the optimum motion of seat components 14.

A linkage between seat components 14 and existing algorithms for accident consequence mitigation might furthermore be possible. For example, in the case of an activation of a rollover sensing function, seat components might be displaced into the corresponding positions well before airbag triggering.

In order at least partly to "enclose" or "surround" an occupant and/or a child seat when seat components 14 are extended in the form of a shell, the extended seat components 14 proceed substantially in the direction of a longitudinal vehicle axis 22.

FIGS. 2a and 2b show an exemplifying embodiment in which seat components 14, 14a are integrated into seatback 10b of vehicle seat 10. The integration of seat components 14, 14a is configured in such a way that they are mounted extendably in seatback 10b so as to enable a lateral rotation of seat components 14, 14a with respect to the stationary seatback 10b, or an arc-shaped extension of seat components 14, 14a out of seatback 10b. The rotation occurs in a direction about a vertical vehicle axis 26. Seat components 14, 14a are configured in such a way that when seat components 14, 14a are extended in the form of a shell, an occupant is at least partly "enclosed" or "surrounded," so that lateral guidance of the occupant is ensured. In this exemplifying embodiment, seat components 14, 14a are extended on both sides of vehicle seat 10, i.e. bilaterally, in order to create the shell shape. This means that the exemplifying embodiment depicted in FIGS. 2a and 2b provides for an extendably mounted seat component system 14, 14a in the interior of vehicle seat 10. Upon the occurrence of lateral forces, system 14, 14a can bilaterally rotate out of the interior of vehicle seat 10 or extend out of the interior of vehicle seat 10, and securely surround the occupant in vehicle seat 10 from behind, like an arm. Depending on the motion direction of the occupant, the preferably shell-like seat components 14, 14a can be extended unilaterally or bilaterally out of vehicle seat 10, seat components 14, 14a being, in the inactive position or normal state, integrated or retracted into vehicle seat 10 and thus not visible. Vehicle seat 10 according to the present invention thus possesses seat components 14 and 14a that serve, in a relevant driving situation, to brace or protect the occupant by extending out of vehicle seat 10. In addition, system 14 can also take on the function of an "active" vehicle seat 10.

FIG. 3 shows an exemplifying embodiment in which only seat components 14, 14a of passenger seat 10 that face toward the crash, or seat components 14, 14a of driver's seat 10 that face toward the crash, are very quickly extended and/or rotated and can thus be positioned protectively in front of the occupant. It may be useful for no seat component to be extended on the side facing away from the crash, thereby allowing movement capabilities for the occupant in the direction of the "safe" side.

In a further embodiment, multiple seat components 14 can be integrated into a vehicle seat 10. Multiple body regions of an occupant can thus be braced, and protected from collisions, in the relevant triggering situation. Possible body regions might be, for example, the occupant's head region, torso region, pelvic region, and/or thigh region. FIG. 4, for example, shows a vehicle seat 10 having seat components 14, 14a in the torso region and in the pelvic region, and having seat components 14, 14b in the thigh region, seat components 14, 14a, 14b being extended in this case only unilaterally. Also conceivable is an additional mechanism (not depicted here) in the interior of vehicle seat 10 that pivots seatback 10*b* and/or an armrest of vehicle 10 more tightly against the occupant.

Figure 5A:
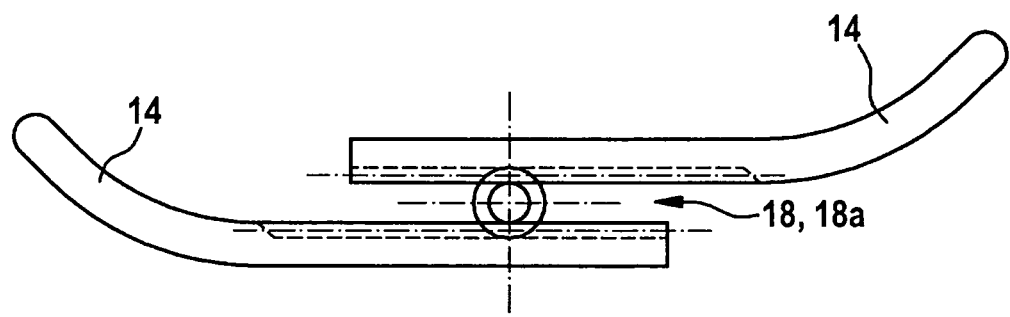
FIG. 5a schematically depicts a displacement device for displacing the seat components according to the present invention, two seat components being displaceable by way of one displacement device.
Figure 5B:
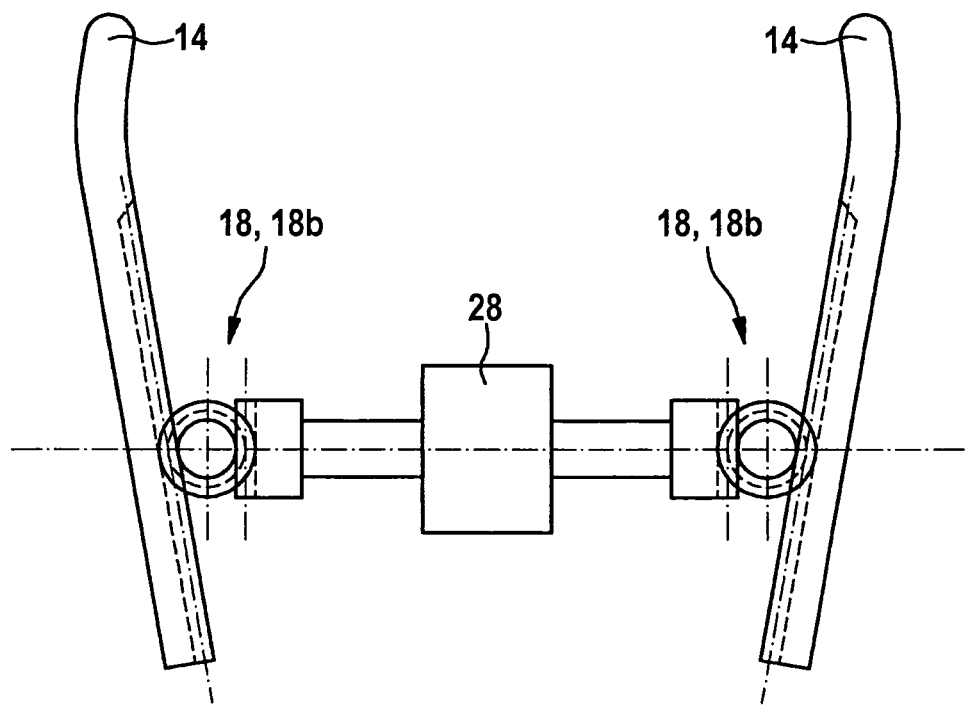
FIG. 5b schematically depicts a displacement device for displacing the seat components according to the present invention, each seat component being displaceable by way of a separate displacement device.

FIGS. 5*a* and 5*b* show displacement device 18, 18*a*, 18*b* for displacing seat components 14 which, as already mentioned, can be driven via an electrical and/or mechanical and/or pyrotechnic and/or pneumatic and/or hydraulic drive system. A pyrotechnic unit would be, in this context, correspondingly superimposed on an electromechanical unit so that the two concepts enable a corresponding activation of displacement device 18, 18*a*, 18*b*. The embodiment of displacement device 18, 18*a*, 18*b* in accordance with FIGS. 5*a* and 5*b* has a gear system that enables a retraction and extension of seat components 14, depending on rotation direction; according to FIG. 5*a*, two seat components 14 are displaceable by way of one displacement device 18, 18*a*, and according to FIG. 5*b* each seat component 14 is displaceable via a separate displacement device 18, 18*b*. Displacement device 18, 18*b* is driven by an electrical drive system 28. A corresponding coupling provides a capability for being pulled out only unilaterally. As an alternative to this, it is also possible to resort to proven functional principles or existing systems such as those installed, for example, in a seatbelt tensioner.

In an operating method for a vehicle seat 10 having displaceable seat components 14 that produce a lateral bracing as a function of accelerations in the direction of a transverse vehicle axis 16, according to the present invention the seat components 14 integrated into vehicle seat 10 are at least partly extended in a necessitating situation.

The displaceable seat components 14 preferably operate together with a restraint system having a transverse dynamics-dependent restraint force, i.e. with a restraint system effective in side collisions. The restraint system can be, for example, a belt system with transverse dynamics-dependent belt tensioning. The displaceable seat components 14 can thus be a conceivable alternative or supplement to restraint systems having a transverse dynamics-dependent restraint force that are already present. Advantageously, the displaceable seat components 14 can be used in both the front seats and the rear seats of a vehicle 12, and a seat occupancy detection system or occupant position sensing system can be provided.

What is claimed is:

1. A vehicle seat arrangement, comprising:
   a seat body including a seat and a seat back at a rear of the seat; and
   at least one displaceable seat component configured to be shifted in at least two degrees of freedom, from a retracted state to an actuated state in response to satisfaction of a condition regarding accelerations in a direction of a transverse vehicle axis;
   wherein:
      with respect to each of the at least one displaceable seat component:
         in a retracted state, the respective displaceable seat component is situated entirely within the seat back; and
         in an actuated state, the respective displaceable seat component is at least partly extended forward from an interior of the seat back, thereby forming a respective interior sidewall of the seat; and
      a boundary of the seat body is defined by an opening of a recess into which the at least one displaceable seat component is retractable.

2. The vehicle seat as recited in claim 1, wherein the condition regarding accelerations includes a crash situation, a comfort requirement, a requirement for retaining a child seat, and wherein the at least one displaceable seat component is configured to counteract a motion of at least one of a vehicle occupant and a child seat at least in the direction of the transverse vehicle axis.

3. The vehicle seat as recited in claim 2, wherein the at least on displaceable seat component includes a plurality of displaceable seat components that are displaceable mutually independently with the aid of at least one displacement device.

4. The vehicle seat as recited in claim 3, wherein the at least one displacement device is configured to be actuated at least one of electrically, mechanically, pyrotechnically, pneumatically and hydraulically.

5. The vehicle seat as recited in claim 3, wherein the actuation of the at least one displacement device is controllable by at least a control system of the vehicle.

6. The vehicle seat as recited in claim 5, wherein the actuation of the at least one displacement device is additionally controllable by a user of the vehicle seat.

7. The vehicle seat as recited in claim 6, wherein displacement travel of the at least one displaceable seat component depends on at least one of (a) the accelerations in the direction of the transverse vehicle axis and (b) a magnitude of an acceleration to be braced against.

8. The vehicle seat as recited in claim 7, wherein the at least one displaceable seat component, when extended, is when extended, are oriented substantially in the direction of a longitudinal vehicle axis.

9. The vehicle seat as recited in claim 8, wherein the at least one displaceable seat component is integrated into at least one of a seat cushion, a backrest, and a headrest of the seat body.

10. The vehicle seat as recited in claim 1, wherein the at least one displaceable seat component is at least partly retractable into the interior of the seat body in response to at least one predetermined criterion.

11. The vehicle seat as recited in claim 1, wherein the two degrees of freedom include rotation and translation.

12. An operating method for a vehicle seat arrangement including at least one displaceable seat component integrated into a seat body, the seat body including a seat and a seat back at a rear of the seat, the method comprising:
   detecting accelerations in a direction of a transverse vehicle axis; and
   responsive to the detected accelerations, shifting the at least one displaceable seat component in at least two degrees of freedom, from a retracted state to an actuated state;
   wherein:
      the shifting includes at least partly extending forward the at least one displaceable seat component from an interior of the seat back, by which extension each of the at least one displaceable seat component forms a respective interior sidewall of the seat;
      with respect to each of the at least one displaceable seat component, in the retracted state of the respective displaceable seat component, the respective displaceable seat component is situated entirely within the seat back; and
      a boundary of the seat back is defined by an opening of a recess into which the at least one displaceable seat component is retractable.

13. A vehicle seat comprising:
   a seat body;
   displaceable seat components; and
   guides;
   wherein:
      each of the displaceable seat components is:
         integrated into an interior of the seat body;
         at least partly extendable from the interior of the seat body to be in an extended state, the extension being by movement of the respective seat component relative to, and in a direction that is parallel to a direction of extension of, a respective one of the guides; and configured to produce a lateral bracing as a function of accelerations in the direction of a transverse vehicle axis; and at least one of:

the guides are curved and the extension of the displaceable seat components is in a curving direction along the curve of the guides; and the displaceable seat components are rigid both when positioned in the interior of the seat body and when in their extended state.

14. The vehicle seat of claim 13, wherein, with respect to each of the displaceable seat components, the extension of the respective seat component is by movement of the respective seat component between different points along the respective guide.

* * * * *